United States Patent
Lessin (12)

(10) Patent No.: US 10,445,771 B2
(45) Date of Patent: *Oct. 15, 2019

(54) EXPORT PERMISSIONS IN A CLAIMS-BASED SOCIAL NETWORKING SYSTEM

(71) Applicant: Facebook, Inc., Menlo Park, CA (US)

(72) Inventor: Samuel Lessin, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 197 days.

This patent is subject to a terminal disclaimer.

(21) Appl. No.: 14/923,365

(22) Filed: Oct. 26, 2015

(65) Prior Publication Data

US 2016/0048870 A1 Feb. 18, 2016

Related U.S. Application Data

(63) Continuation of application No. 13/646,354, filed on Oct. 5, 2012, now Pat. No. 9,201,836.

(51) Int. Cl.
*H04L 29/06* (2006.01)
*H04L 29/08* (2006.01)
(Continued)

(52) U.S. Cl.
CPC ........ *G06Q 30/0248* (2013.01); *G06F 15/16* (2013.01); *G06F 21/6218* (2013.01); *G06Q 30/0277* (2013.01); *G06Q 50/01* (2013.01); *H04L 63/102* (2013.01); *H04L 67/22* (2013.01); *H04L 67/327* (2013.01)

(58) Field of Classification Search
CPC ............ G06Q 30/0248; G06Q 21/6218; H04L 63/102

USPC ..... 709/203, 204, 205, 207, 219; 705/14.23, 705/14.4, 14.47, 14.53
See application file for complete search history.

(56) References Cited

U.S. PATENT DOCUMENTS 7,069,310 B1 6/2006 Bartholomew
9,152,312 B1 * 10/2015 Terleski ................ G06F 3/0488
(Continued)

OTHER PUBLICATIONS

"The Role of Social Network Sites in Romantic Relationships: Effects on Jealousy and Relationship Happiness"—Utz et al, Journal of Computer-Mediated Communication, Jul. 5, 2011 https://onlinelibrary.wiley.com/doi/full/10.1111/j. 1083-6101.2011. 01552.x (Year: 2011).*
(Continued)

*Primary Examiner* — Randy A Scott
(74) *Attorney, Agent, or Firm* — Fenwick & West LLP (57) ABSTRACT

A social graph, which records the actions of users in a social networking system platform, may be modeled at least in part as a collection of claims that may be exported to other systems, such as third party publishers, based on permissions granted by users and entities. The social networking system may also act as a publisher, enabling web applications and mobile applications to publish claims to a variety of audiences based on the permissions granted by users and entities, or agents of the social networking system. Permissions may be granted based on agreed-upon terms of service between agents, agents and publishers, agents and the social networking system platform, and publishers and the social networking system.

20 Claims, 6 Drawing Sheets

(51) Int. Cl.
*G06Q 30/02* (2012.01)
*G06F 15/16* (2006.01)
*G06Q 50/00* (2012.01)
*G06F 21/62* (2013.01)

(56) References Cited

U.S. PATENT DOCUMENTS

| | | | |
|---|---|---|---|
| 2005/0060417 A1* | 3/2005 | Rose | G06Q 10/00 709/228 |
| 2005/0132233 A1* | 6/2005 | James | G06F 21/10 726/4 |
| 2009/0043882 A1 | 2/2009 | Hibbets et al. | |
| 2009/0083155 A1* | 3/2009 | Tudor | G06Q 30/0273 705/14.69 |
| 2009/0265432 A1* | 10/2009 | Suehiro | G06Q 10/10 709/206 |
| 2010/0332504 A1 | 12/2010 | Brucker et al. | |
| 2012/0239507 A1* | 9/2012 | Braginsky | G06Q 10/10 705/14.69 |
| 2013/0268369 A1* | 10/2013 | McMaster | G06Q 30/01 705/14.66 |

OTHER PUBLICATIONS

Utz et al., "The Role of Social Network Sites in Romantic Relationships: Effects on Jealousy and Relationship Happiness," Journal of Computer-Mediated Communication, vol. 16, 2011, pp. 511-527. http://onlinelibrary.wiley.com/doi/10.1111/j.1083-6101.2011.015- 52.x/pdf.

Office Action for U.S. Appl. No. 13/646,354 dated Feb. 4, 2015, sixteen pages.

Office Action for U.S. Appl. No. 13/646,354 dated Aug. 29, 2014, sixteen pages.

* cited by examiner

EXPORT PERMISSIONS IN A CLAIMS-BASED SOCIAL NETWORKING SYSTEM

CROSS REFERENCE TO RELATED APPLICATIONS

This application is a continuation of prior, U.S. patent application Ser. No. 13/646,354, filed Oct. 5, 2012, now allowed, which is incorporated herein by reference in its entirety.

BACKGROUND

This invention relates generally to social networking, and in particular to export permissions in a claims-based social networking system.

In recent years, social networking systems have enabled users to share information about themselves, their friends, and their interests and preferences in real-world concepts with other users and entities, such as their favorite movies, musicians, celebrities, soft drinks, hobbies, sports teams, and activities. Users may also include biographical information about themselves, such as where they grew up, what colleges and universities they attended, where they have worked, their current contact information, and so forth. The amount of information gathered from users is staggering—information describing recent moves to a new city, political preferences, causes, graduations, births, engagements, marriages, and the like. Entities may also declare attributes, affiliations, and other information, such as pages representing businesses, groups of users representing various organizations, and applications operating on social networking systems on behalf an entity.

Users may also interact with these entities through various applications on the social networking systems, providing more information about the users based on their interactions on the social networking systems. A social graph of nodes interconnected by edges may be created through these interactions between users, entities, and other nodes on social networking systems. The edges representing interactions between the nodes have been assumed to be based on absolute truth and have been generated from the perspective of the user. In this way, a user may express interests and share information with other users and entities in social networking systems.

As social networking systems have begun providing tools for users to share information about themselves, this information has been accepted as an absolute truth, even where some uncertainty may exist in the statements. For example, a user may state that he or she is from Dallas, Tex., when in fact the user is from a nearby suburb of Dallas, Tex. As a result, the social networking system provides inaccurate information about the hometown of the user to other users of the social networking system. This may lead to ineffective targeted advertising directed towards the user based on inaccurate information. Further, the user experience is diminished because of the inaccurate information being provided. Fundamentally, the information provided on the social networking system by users, entities, and applications on behalf of users and entities may be more accurately described as a series of claims of information that require fact checking, reputation tracking, and/or trust building. Claims are assertions made by an author in the context of an audience. As a result, claims that have been verified as truthful or reliable are very valuable pieces of information about users, entities, and applications in the social networking system.

Social networking systems have not provided tools or mechanisms for enabling users and entities to selectively allow specific users and/or entities to export claims made in building the social graph of interactions between users, entities, and interests. Accurate information about users, their connections with other users, and entities on social networking systems, as well as their interests and preferences provides a better user experience while enabling third-party developers to more accurately target users and better build applications that seek to drive traffic and increase engagement with their websites. However, existing systems have not provided efficient tools and methods to export assertions made by users in building a social graph to other applications, users, entities, and third-party developers.

SUMMARY

A social graph, which records the actions of users in a social networking system platform, may be modeled at least in part as a collection of claims that may be exported to other systems, such as third party publishers, based on permissions granted by users and entities. The social networking system platform may also act as a publisher, enabling web applications and mobile applications to publish claims to a variety of audiences based on the permissions granted by users and entities, or agents of the social networking system. Permissions may be granted based on agreed-upon terms of service between agents, agents and publishers, agents and the social networking system platform, and publishers and the social networking system platform.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Social networking systems have previously modeled interactions, relationships, and other social information using a social graph, which includes nodes connected by edges. Nodes may include users, entities, and objects of the social networking system platform, such as web pages embodying concepts. Edges represent a particular interaction between two nodes, such as when a user creates a new connection with another user or expresses an interest in a web page about a new movie. The social graph may record interactions between users of the social networking system as well as interactions between users and objects of the social networking system by storing information in the nodes and edges that represent these interactions. Custom graph objects and graph actions may be defined by third-party developers as well as administrators of the social networking system to define attributes of the graph objects and graph actions. For example, a graph object for a movie may have several defined attributes, such as title, actors, directors, producers, year, and the like. Custom graph objects and graph actions are further discussed in a related application, "Structured Objects and Actions on a Social networking system platform," U.S. patent application Ser. No. 13/239,340, filed on Sep. 21, 2011, hereby incorporated by reference.

Instead of or in addition to modeling the social graph using nodes and edges, a social networking system may be structured on top of a collection of claims made by users and entities of the social networking system. A claim, as stored as a data structure in the social networking system platform, includes some or all of the following components:

Author
Owner
Assertion
Audience
Copyrights
Metadata associated with the claim by the social networking system A user may make a number of "claims" on a social networking system platform, such as having attended a certain college, working for a certain company, being raised in a certain location, or being friends with other users of the social networking system. Claims on a social networking system include other declared user profile information, such as where the user currently lives and other biographical information about the user, including the age, gender, hometown, dating interests, relationship status, languages spoken, religious beliefs, and political views, as well as other information, including contact information, work and education experience, family members, historical events posted to a timeline, and favorite quotes.

Claims may be "authored" by "agents" of the social networking system platform, such as users, entities, and application authorized to act on behalf of an agent. An author agent may designate an "owner" to assign ownership of a claim. An owner agent may specify certain settings for a claim, such as whether the claim may be copied by other agents and whether the claim may be boosted in rankings by other agents. Each claim includes an "assertion" that includes a "payload" of content that is written to the social graph. The payload of content is the core of an assertion. A claim may have a claim type, just as edges have edge types. For example, a claim that a user currently lives in San Francisco has a claim type of current city. The claim type may be assigned as a metadata object by the social networking system.

A social networking system may act as a platform, enabling agents, publishers, and applications to exchange information. In order to effectively manage and/or guarantee rights over the information stored in a social networking system platform, terms of service agreements may be negotiated between agents, agents and publishers, publishers and other applications, and publishers and the social networking system platform. Terms of service may delineate one or more permissions attached to an information item generated by an agent and published as a claim on the social networking system by a publisher. Based on the terms of service, permissions metadata objects may be generated by the social networking system for published claims. An agent may, through the terms of service agreements, provide permission for audience members, or agents and/or applications that may view the claim in the social networking system platform, to copy, download, and/or otherwise export the payload of the claim, or assertion, into an external system, in one embodiment. In another embodiment, an agent may provide permission for advertisers to target the agent based on claims authored by the agent, claims about the agent, and/or claims generated by others through applications that have provided the necessary advertising permissions through one or more terms of service agreements. In this way, agents and publishers may agree on a heterogeneous set of terms that are mutually beneficial and effectively manage the rights to exchange information on the social networking system platform.

Figure 1:
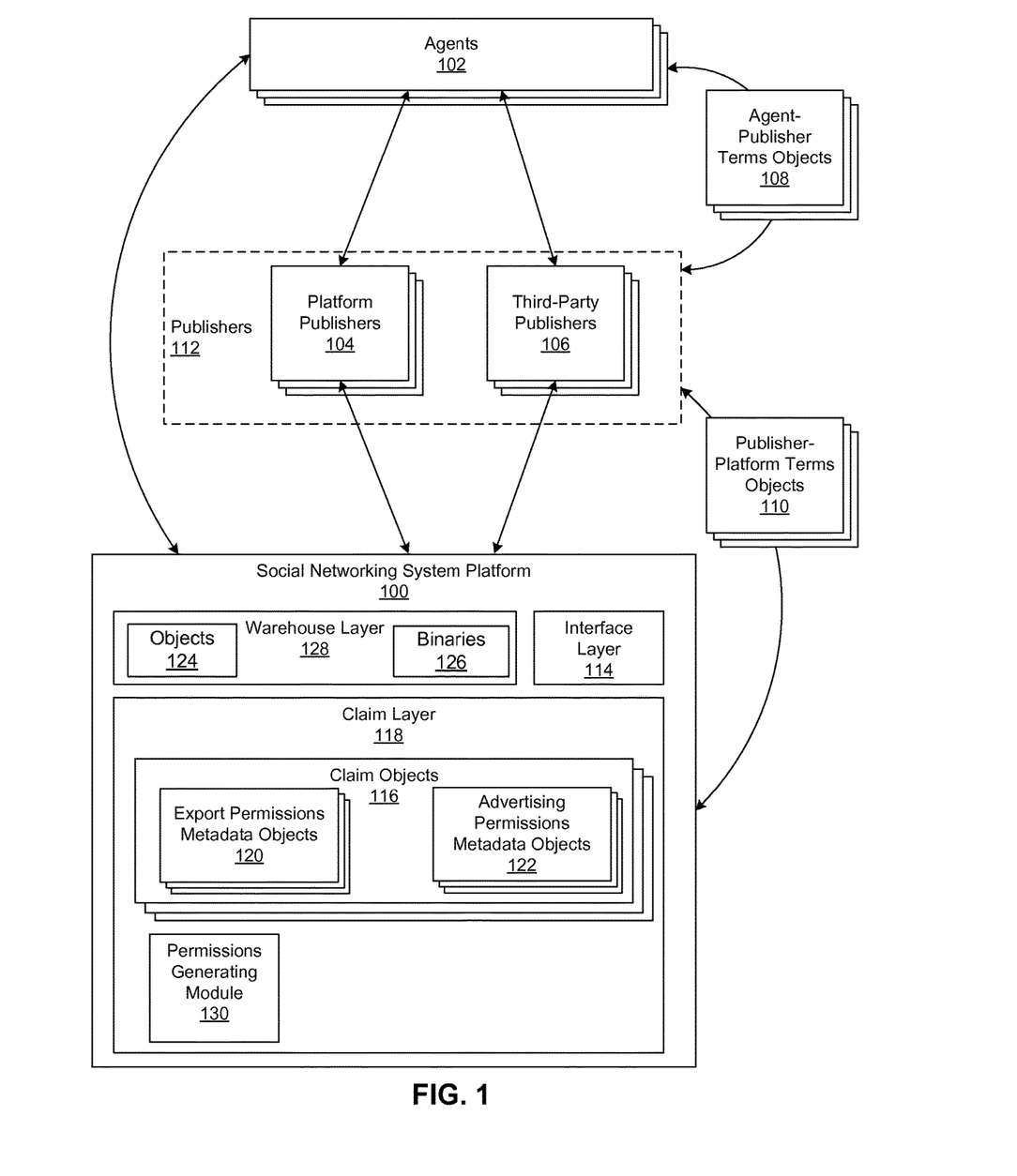
FIG. 1 is high level block diagram illustrating a process of generating permissions for claims in a social networking system platform, in accordance with an embodiment of the invention.

FIG. 1 illustrates a high-level block diagram of a process for generating permissions for claims in a social networking system in a social networking system platform, in one embodiment. A social networking system platform 100 may include an interface layer 114, a claim layer 118, and a warehouse layer 128. An interface layer 114 includes various modules for interfacing with user devices, external systems, and applications. A claim layer 118 includes claim objects 116 for modeling all interactions on the social networking system platform 100 as claims. Claim objects 116 represent different types of claims, including content items, user profiles, interactions between users, entities, and applications, and also may include export permissions metadata objects 120 and advertising permissions metadata objects 122. A warehouse layer 128 is used to store content on the social networking system platform 100 as objects 124 and/or binaries 126. The structure of claims is further discussed in a related application, "Evaluating Claims in a Social networking system platform," U.S. patent application Ser. No. 13/455,047, filed on Apr. 24, 2012, hereby incorporated by reference.

Agents 102 may interact with the social networking system platform 100 through the interface layer 114, creating claim objects 116 through their interactions with other agents 102, such as users, entities, and applications. Agents 102 may also interact with platform publishers 104 and third-party publishers 106, or more generically, publishers 112 of the social networking system platform 100. Platform publishers 104 include applications created by administrators of the social networking system platform 100, such as a photo album application, a newsfeed generator, a mobile application for operation on mobile devices, an address book application, and so forth. Third-party publishers 106 include applications that can publish to the social graph of the social networking system platform 100 that were not created by administrators of the social networking system platform 100. Third-party publishers 106 may also include applications operating on external systems, such as location-sharing applications, photo-sharing applications, and other content-sharing applications. Publishers 112 may generate claims on the social networking system platform 100 that may include a wealth of personal information of users, such as contact information of users, content generated by users, users' expressions of interest in products, businesses, content, and celebrities, as well as other information items that may be represented as claims in the social networking system platform 100.

Because agents 102 of the social networking system platform 100 may generate derivative claims using the social networking system platform 100 as a publisher 112, the export permissions metadata objects 120 and advertising permissions metadata objects 122 are generated for each claim object 116 to ensure compliance with the agreed-upon terms of service used to generate the claims. For example, an agent 102 may publish a claim through a third-party publisher 106 that he "likes Ferrari." The agent 102 may specify that the claim may not be used for ad targeting purposes in the terms of service agreement with the third-party publisher 106. However, the agent 102 may allow audience agents, or users and/or entities in the social networking system platform 100 that have access to the claim, to export the claim to an application, another third-party publisher 106, that may be used to generate a derivative claim that the agent 102 "likes fancy cars." The derivative claim may be used for ad targeting purposes based on the advertising permissions agreed upon by the audience agent, in one embodiment. In another embodiment, the agent 102 may negotiate a specific term export permission term that forbids use of the claim to be later used for an advertising purpose. As a result, the export permissions metadata objects 120 and advertising permissions metadata objects 122 may be highly customized by the negotiated terms of service agreement.

Agent-publisher terms objects 108 may be generated through agents' use of publishers 112 to publish claims to the social graph of the social networking system platform 100. A publisher 112 may publish claims on behalf of an agent 102 after the agent 102 and the publisher 112 agree upon a set of terms of service, usually obtained through an authorization process or a form provided by the publisher 112 to the agent 102 before the agent 102 is able to use the publisher 112, in one embodiment. An agent-publisher terms object 108 may include terms by which a publisher 112 has the right to write or read information to/from the social networking system platform 100 about an agent 102. These terms specify the rights the agent 102 maintains over the information in the social networking system platform 100 and the rights which the publisher 112 withholds as publisher of the information. In one embodiment, agent-publisher terms objects 108 also include advertising permissions and export permissions for claims objects 118 generated by the publisher 112 on behalf of the agent 102.

Publisher-platform terms objects 110 may be generated based on agreed-upon terms of service between a publisher 112 and a social networking system platform 100. Third-party publishers 106 may be allowed to publish claims to the social graph of the social networking system platform 100 upon agreeing to one or more terms of service defined by administrators of the social networking system platform 100, in one embodiment. Publisher-platform terms may include terms that define how the publisher 112 may publish claims, any permissions and/or restrictions on rights for certain agents 102 to use information published by the publisher 112, such as competitive companies that may wish to use claims to target offers to the authoring users, as well as other agreements, such as an agreed fee-per-clickthrough (or impression) whenever a claim that the third-party publisher 106 has written is used to target an agent 102 with an advertisement that the agent finds appealing.

The social networking system platform 100 may store agent-publisher terms objects 108 and publisher-platform terms objects 110 in the social networking system platform 100 as objects 124 in the warehouse layer 128, in one embodiment. A permissions generating module 130 may process the agent-publisher terms objects 108 and publisher-platform terms objects 110 to generate export permissions metadata objects 120 and advertising permissions metadata objects 122. For example, agent-publisher terms objects 108 may be associated with claim objects 116 generated by publishers 112. The agent-publisher terms objects 108 may define how the associated claim objects 116 may be exported or used for advertising purposes. As a result, the permissions generating module 130 may generate appropriate export permissions metadata objects 120 and/or advertising permissions metadata objects 122 according to the associated agent-publisher terms objects 108 for each claim object 116. Similarly, publisher-platform terms objects 110 may be attached to claim objects 116 generated by publishers 112 and processed by the permissions generating module 130 to generate export permissions metadata objects 120 and/or advertising permissions metadata objects 122 based on the publisher-platform terms objects 110.

In one embodiment, export permissions metadata objects 120 and/or advertising permissions metadata objects 122 may be generated for claim objects 116 based on received selections of links in a user interface on the social networking system platform 100. For example, an agent may select a link on a user interface to restrict advertisers from using claims published by the agent as targeting criteria for advertisements and may select another link to permit exporting of claims by certain audience agents, friends of the agent. In another embodiment, export permissions metadata objects 120 and/or advertising permissions metadata objects 122 may be generated for claim objects 116 based on received objects in an application programming interface (API) on the social networking system platform 100.

System Architecture

Figure 2:
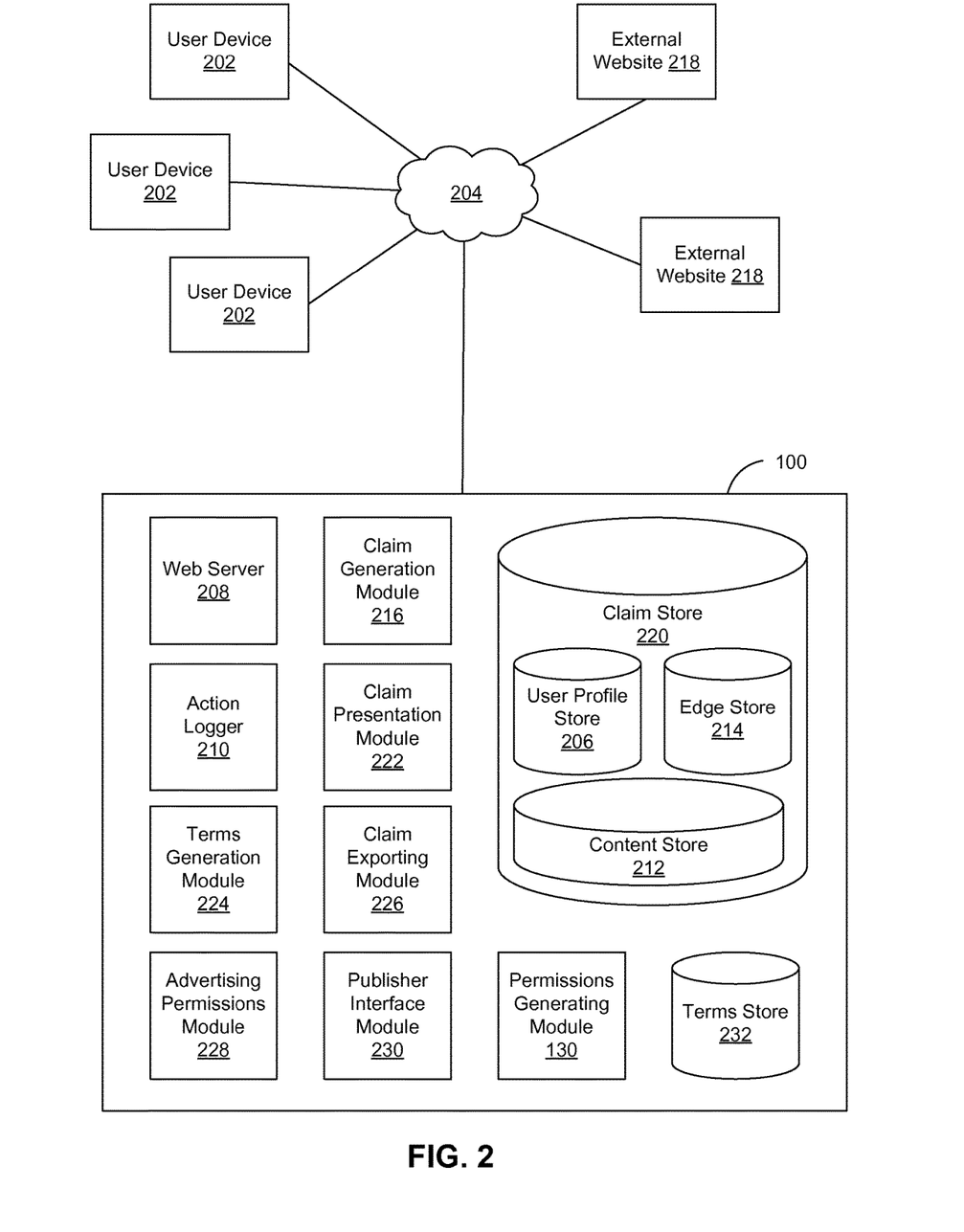
FIG. 2 is a network diagram of a system for generating permissions for claims in a social networking system platform, showing a block diagram of the social networking system platform, in accordance with an embodiment of the invention.

FIG. 2 is a high level block diagram illustrating a system environment suitable for generating permissions in a claims-based social networking system platform, in accordance with an embodiment of the invention. The system environment comprises one or more user devices 202, the social networking system platform 100, external websites 218, and a network 204. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system platform 100. In another embodiment, the user device 202 interacts with the social networking system platform 100 through an application programming interface (API) that runs on the native operating system of the user device 202, such as iOS and DROID.

In one embodiment, the network 204 uses standard communications technologies and/or protocols. Thus, the network 204 can include links using technologies such as Ethernet, 802.11, worldwide interoperability for microwave access (WiMAX), 3G, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system platform 100. The social networking system platform 100 includes a claim store 220 including a user profile store 206, a content store 212, and an edge store 214, a web server 208, an action logger 210, a claim generation module 216, a claim presentation module 222, a terms generation module 224, a claim exporting module 226, an advertising permissions module 228, a publisher interface module 230, a permissions generating module 130, and a terms store 232. In other embodiments, the social networking system platform 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system platform 100 via the network 204 to one or more user devices 202; the web server 208 serves web pages, as well as other web-related content, such as Java, Flash, XML, and so forth. The web server 208 may provide the functionality of receiving and routing messages between the social networking system platform 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native client device operating systems, such as iOS, DROID, webOS, and RIM.

The action logger 210 is capable of receiving communications from the web server 208 about user actions on and/or off the social networking system platform 100. The action logger 210 populates an action log with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

As described and illustrated in FIG. 1 above, the social networking system platform 100 includes a warehouse layer 128 and a claim layer 118. As illustrated in FIG. 2, a claim store 220 is a conceptualized database that stores claim objects 116. The claim store 220 resides in the claim layer 118 of the social networking system platform 100 and points to storage and objects that are in the warehouse layer 128. Claim objects 116 represent claims made by agents in the social networking system platform 100. Because claim objects 116 are fundamental to all objects on the social networking system platform 100, a user profile store 206, an edge store 214, and a content store 212 may reside, conceptually, within the claim store 220. For example, a user profile object for a user may be defined as a claim object 116 that includes the assertion that the social networking system platform 100 has generated an agent that corresponds to the user. Likewise, edge objects and content objects may be similarly defined as claim objects 116.

User account information and other related information for a user are stored in the user profile store 206. The user profile information stored in user profile store 206 describes the users of the social networking system platform 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system platform 100 displayed in an image. The user profile store 206 also maintains references to the actions stored in an action log and performed on objects in the content store 212.

The edge store 214 stores the information describing connections between users and other objects on the social networking system platform 100. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system platform 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users.

The content store 212 stores content objects, such as photos, videos, status updates, and content items shared with users of the social networking system platform 100. Content objects may comprise claim objects 116 that represent agent actions on the social networking system platform 100. For example, a user may upload a photo from his mobile device to the social networking system platform 100. Location information embedded in the photo saved in an exchangeable image file format (EXIF) may be used to validate the location of the user who claims to live in San Francisco, Calif. Other types of content objects, such as pages on the social networking system platform 100 that represent interests of users of the social networking system platform 100, places, businesses and other real-world entities, as well as external websites 218, are stored in the content store 212.

User interactions with content objects are stored in edge objects in the edge store 214.

A claim generation module 216 generates claim objects 116 based on actions performed in a social networking system platform 100 as well as on external websites 218. In one embodiment, certain user actions, such as declaring profile information attributes such as age, current living situation, relationship status, and the like, may trigger the claim generation module 216 to automatically generate claim objects 116 for the user-declared assertions. In another embodiment, the claim generation module 216 may provide a user interface for users to make claims about other objects in the social networking system platform 100, such as claiming the best phone number of another user, claiming the physical addresses of a number of people, claiming that another user is a good co-worker, claiming that a restaurant has good chicken wings, and claiming appointments made through events inputted into the social networking system platform 100.

A claim presentation module 222 provides to a viewing agent claim objects 116 that are accessible by the viewing agent based on whether the viewing agent is included in the audiences indicated in the claim objects 116. In one embodiment, the claim presentation module 222 provides claim objects 116 associated with a subject, such as a user of the social networking system platform 100, a page of the social networking system platform 100 representing an entity, and a concept or keyword that may be included in communications made by users of the social networking system platform 100 and extracted into an object on the social networking system platform 100. The claim presentation module 222 may provide information included in a claim about a subject user being a great pastry chef, for example, including a photo of a cake made by the subject user, to viewing agents included in the audience of the claim.

As another example, an author may claim that the best dry fried chicken wings are served at Mission Chinese Restaurant to an audience by leaving a recommendation for a page representing Mission Chinese Restaurant in the social networking system platform 100. A viewing agent of the page representing Mission Chinese Restaurant may be provided with the claim from the author if the viewing agent is included in the audience of the claim. Different recommendations, which may conflict, may be provided to a viewing agent based on claims made by authors in which the viewing agent is included in the audiences of the claims. Note that a different viewing agent, who is not included in the audience of the claim by the author that the best dry friend chicken wings are served at Mission Chinese Restaurant, cannot view that claim. The administrators of the page for Mission Chinese Restaurant may also not be able to view claims if they are not included in the audience of the claims.

A concept being discussed by users on a social networking system platform 100, such as "Barack Obama" after the State of the Union address, may generate claim objects 116 in which authors discussing the speech may make claims about Barack Obama, such as whether he is a good speaker, how the President addresses the issues, and so on. The claim presentation module 222 may provide these claims about the President, the State of the Union address, and/or politics to users included in the audience, in one embodiment.

In each of these examples, valuable information may be stored in claim objects 116 based on the claims generated by agents in the social networking system platform 100. Audience agents may desire to export this information to external systems, such as positive reviews being export to a restaurant's website, or use such information for advertising purposes, such as using a positive review as targeting criteria for an advertisement targeting the authoring agent's connections in the social networking system platform 100.

A terms generation module 224 generates terms objects, such as agent-publisher terms objects 108 and publisher-platform terms objects 110, that are stored in the terms store 232. Terms objects may be stored separately from claim objects 116, in one embodiment. In another embodiment, terms objects may be generated by the terms generation module 224 based on one or more selected terms defined by agents 102, publishers 112, and/or administrators of the social networking system platform 100. In yet another embodiment, terms objects may be generated by the terms generation module 224 based on one or more selections of links provided in a user interface on a user device 202, where the selections determine the terms that have been agreed to by the agent 102 or publisher 112 making the selections.

A permissions generating module 130 processes terms objects, including agent-publisher terms objects 108 and publisher-platform terms objects 110, to generate export permissions metadata objects 120 and advertising permissions metadata objects 122 for claim objects 116 in the social networking system platform 100. The permissions generating module 130 may interpret the terms included in the agent-publisher terms objects 108 and the publisher-platform terms objects 110 to determine export permissions to be stored in export permissions metadata objects 120 as well as advertising permissions to be stored in advertising permissions metadata objects 122. In one embodiment, the permissions generating module 130 may receive export permissions and/or advertising permissions from a user interface in the social networking system platform 100 or from an application programming interface (API). In one embodiment, default permissions may be set for export permissions and/or advertising permissions, as well as the right to update those permissions, where the agent-publisher terms objects 108 and/or the publisher-platform terms objects 110 do not specify export permissions and/or advertising permissions.

A claim exporting module 226 provides one or more selected claims to a user device or a system external to the social networking system platform 100 based on the export permissions metadata objects 120 for the associated claim objects 116. The claim exporting module 226 may receive a request from an agent of the social networking system platform 100 to download a claim, such as a phone number for a user in the social networking system platform 100, to a user device 202. In one embodiment, export permissions may include various capabilities, such as allowing an author to download claims that they have authored, allowing the author to export claims to other applications, allowing audience agents to copy the claim to the social networking system platform 100, and/or allowing audience agents to export claims to other applications. In other embodiments, export permissions may be customized by an author agent, a publisher, and/or the social networking system platform 100 to include various permissions based on the terms agreed upon by the authoring agent, publisher and/or social networking system platform 100. Because export permissions may be changed based on agreed upon terms, a publisher 112 may retain the right to update export permissions for claims generated by an agent 102 via the publisher 112, or an agent 102 may be assigned that update right.

An advertising permissions module 228 enables one or more selected claims to be used for advertising purposes, including targeting and optimizing advertisements for users of the social networking system platform 100 based on the advertising permissions metadata objects 122 for the associated claim objects 116. Advertisers may request to target advertisements based on various information available about agents 102 in the social networking system platform 100, including claim objects 116. Agents 102, publishers 112, and/or the social networking system platform 100 may agree on certain terms to permit advertisers to target advertisements based on generated claim objects 116. Advertising permissions may include targeting exclusions that identify one or more competitors that may not be permitted to use the claim in targeting ads. Advertising permissions may also include targeting settings that define a fee arrangement for advertisers to use the claim, such as a specific cost-per-click (CPC) dollar amount as well as a boosting permission that enables the claim to be boosted in a search result and/or content stream on the social networking system platform 100. Boosted claims may appear higher in rankings and may be sponsored by an advertiser, such as a claim generated by a publisher 112 on behalf of an agent 102 that includes a picture of a Chanel watch, where the claim is boosted by an advertiser for Chanel for display in search results and content streams on the social networking system platform 100. Targeting settings for the same claim, continuing the example, may identify a particular CPC amount that is paid for advertisements that target a particular agent based on the same claim, such as when viewing the claim on the social networking system platform 100. A separate update right for advertising permissions may be assigned to an agent authoring a claim or a publisher generating the claim and publishes the claim to the social networking system 100, in one embodiment.

A publisher interface module 230 may provide an interface for third-party publishers 106 to negotiate publisher-platform terms of service to be stored as publisher-platform terms objects 110 through a user interface and/or an application programming interface (API). In one embodiment, the publisher interface module 230 may also provide an interface through which third-party publishers 106 can negotiate agent-publisher terms of service to be stored as agent-publisher terms objects 108 through a user interface and/or an API.

Generating Permissions for Claims on a Social Network System Platform

Figure 3:
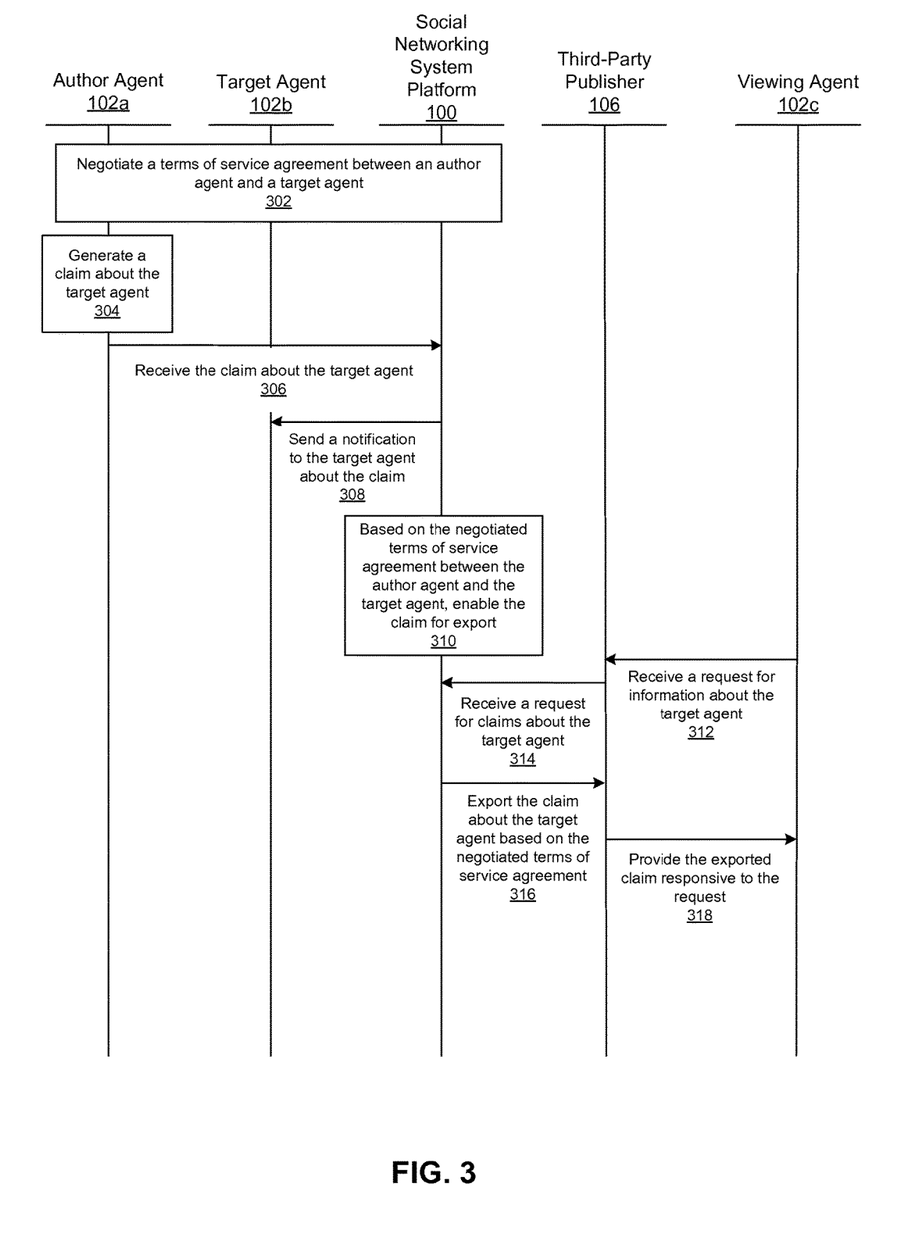
FIG. 3 is an interaction diagram illustrating a process of generating export permissions for claims in a social networking system platform, in accordance with an embodiment of the invention.

FIG. 3 illustrates an interaction diagram depicting a process of generating export permissions for claims in a social networking system platform, in accordance with an embodiment of the invention. A terms of service agreement between an author agent and a target agent may be negotiated 302 through the social networking system platform 100. In one embodiment, an author agent 102a and a target agent 102b may negotiate 302 a terms of service agreement on the social networking system platform 100, such as Stanford University (an author agent 102a) publishing a list of its 2012 graduates including a target agent 102b using a publisher 112 on the social networking system platform 100. The agreement between the author agent 102a and target agent 102b may specify whether or how the author agent 102a may disclose the list. For example, an opt-out term in the agreement between the author agent 102a and target agent 102b may specify that the target agent 102b would have to opt-out of being included in the list of graduates, meaning that the target agent 102b agrees to be included on the published list on the social networking system platform 100 which may be useful for verification of identity and privacy. Other agreements may be negotiated 302, or otherwise inputted into the social networking system platform 100, such as an author agent 102a representing a retailer that enables customers to join a loyalty program to receive in store savings in exchange for providing access to user profile information on the social networking system platform 100. The agreement to join the loyalty program may include an authorization dialog that sets various permissions for claims generated by the retailer about the customer. In that example, a target agent 102b representing a customer of the retailer may agree to the terms of service set forth by the retailer, which may include allowing claims to be authored about the target agent 102b shopping at the retailer, purchasing items, and/or receiving discounts on items. These interactions that may be published as one or more claims on the social networking system platform 100 as one or more claim objects 116.

After a terms of service agreement between the author agent and the target agent is negotiated 302, a claim about the target agent may be generated 304. Continuing a previous example, the claim about the target agent 102b may be that the target agent 102b appears on a list of 2012 graduates of Stanford University. The claim about the target agent may then be received 306 by the social networking system platform 100. The author agent 102a may generate 304 the claim through a platform publisher 104 on the social networking system platform 100 or through a third-party publisher 106. For example, the author agent 102a publishing the list of 2012 graduates of Stanford University may use an application programming interface (API) or user interface on the social networking system platform 100 to publish the list to the social graph on the social networking system platform 100. The claim about the target agent may be received 306 through the API or user interface, in one embodiment.

After the claim about the target agent is received 306 by the social networking system platform 100, a notification about the target agent being included in the claim may be sent 308 to the target agent. The notification may be sent 308 based on the negotiated terms of service agreement, in one embodiment. Based on the negotiated terms of service agreement between the author agent and the target agent, the claim may be enabled 310 for export by the social networking system platform 100. The claim may be enabled 310 for export according to export permissions metadata objects 120 determined from the negotiated terms of service agreement between the author agent 102a and the target agent 102b.

A request for information about the target agent may be received 312 by a third-party publisher 106 from a viewing agent 102c of the social networking system platform 100, in one embodiment. Continuing the above example, a viewing agent 102c, such as a potential employer, may use a third-party publisher 106, such as a job board application external to the social networking system platform 100, to obtain information about the target agent 102b. Such information may include verification information about whether the target agent 102b graduated from Stanford University as verified by the target agent 102b being included in the published list of graduates, represented as a claim object 116 on the social networking system platform 100.

A request for claims about the target agent may be received 314 by the social networking system platform 100 from a third-party publisher 106 as a result of the request for information about the target agent received 312 by the third-party publisher 106, in one embodiment. In the example, the claim about the target agent 102b about being included in the list of 2012 Stanford University graduates may be included in the request received 314 by the social networking system platform 100. In another embodiment, the request for claims about the target agent may be received 314 through a search query for claims executed by the social networking system platform 100 responsive to a search performed through a user interface by an agent. An agent may search for claims about the target agent using the user interface on the social networking system platform 100 by searching on keywords, selecting filters based on demographics and locations, as well as applications, pages, and/or groups in which to narrow the search, for example. The performed search may result in a request for claims about the target agent to be received 314. Because the claim has been enabled 310 for export, the claim about the target agent is exported 316 by the social networking system platform 100 to the third-party publisher 106 based on the negotiated terms of service agreement. The exported claim is then provided 318 to the viewing agent 102c responsive to the request for information about the target agent.

Figure 4:
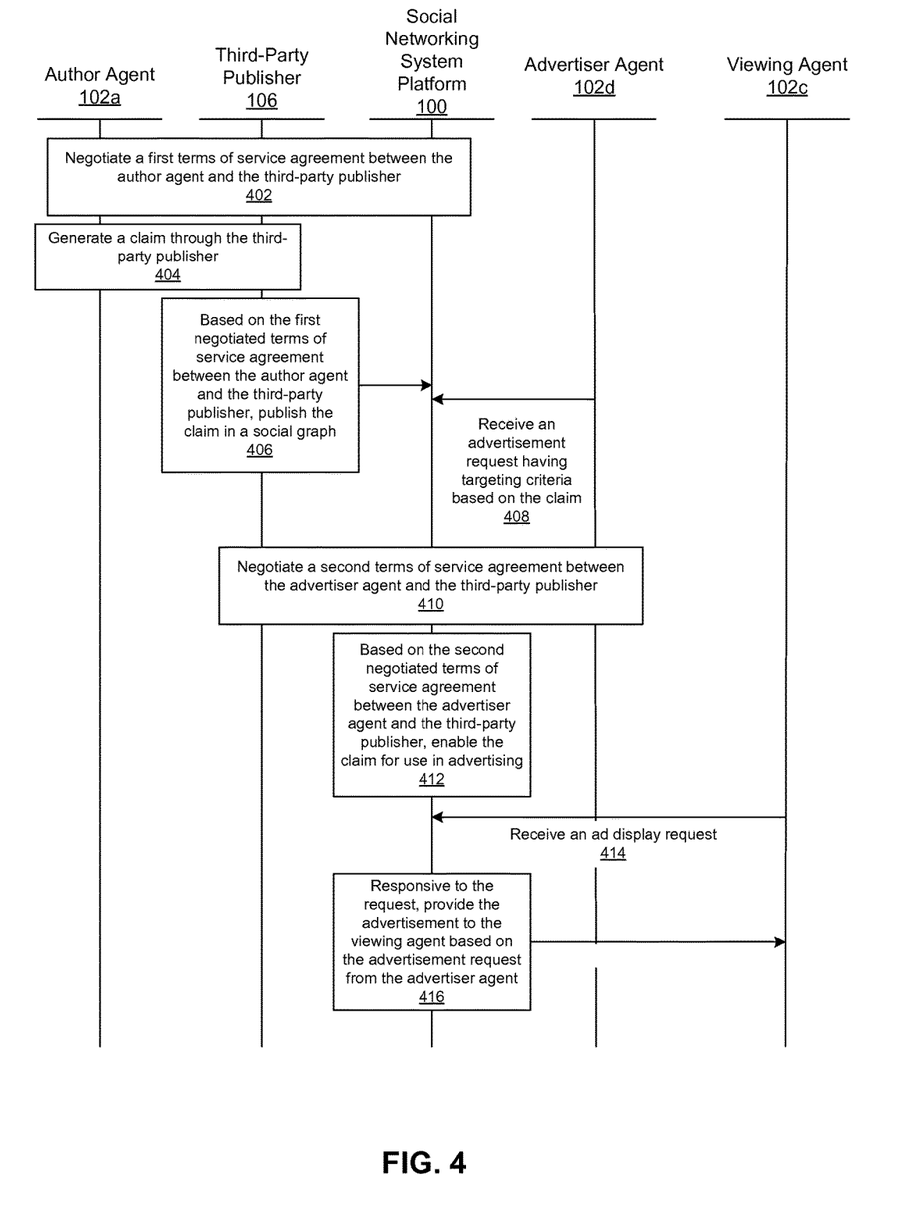
FIG. 4 is an interaction diagram illustrating a process of generating advertising permissions for claims in a social networking system platform, in accordance with an embodiment of the invention.

FIG. 4 illustrates an interaction diagram depicting a process of generating advertising permissions for claims in a social networking system platform, in accordance with an embodiment of the invention. A first terms of service agreement is negotiated 402 between the author agent and the third-party publisher. The first terms of service agreement that is negotiated 402 between an author agent 102 a and the third-party publisher 106 may be stored as a terms object in the social networking system platform 100, such as an agent-publisher terms object 108. A claim may be generated 404 through the third-party publisher 106 by the author agent 102a after the first terms of service agreement is negotiated 402. The agent-publisher terms object 108 may include privacy information, such as defining the set of agents on the social networking system platform able to view claims generated through the third-party publisher 106. The first terms of service agreement negotiated 402 between the author agent 102a and the third-party publisher 106 defines the terms on how the third-party publisher 106 may publish claims to the social networking system platform 100 on behalf of the author agent 102a.

In one embodiment, a default setting for claims published by a third-party publisher 106 may include enabling any advertiser to target advertisements based on the claims published by the third-party publisher 106. In this way, the third-party publisher 106 would be required to "opt-out" of having claims being enabled for targeting advertisements. In another embodiment, a default setting for advertising permissions may include a flat fee arrangement or revenue share agreement, such as a fee per click (CPC) or per impression (CPM) that is owed to the third-party publisher 106 where an advertisement used a claim published by the third-party publisher 106 for targeting or any other advertising purpose. The third-party publisher 106 may specify a CPC or CPM fee, or opt-out.

Based on the first negotiated terms of service agreement between the author agent and the third-party publisher, the claim generated through the third-party publisher 106 is published 406 in a social graph on the social networking system platform 100. Such claims may include a check-in event published to the social graph on the social networking system platform 100 through a third-party mobile application. An indication of expressing interest in a link, photo, news story, and the like on a website external to the social networking system platform 100 or generated on a third-party application for aggregating such content may be published as a claim in the social networking system platform 100, in one embodiment. Other types of claims may be generated through third-party publishers 106, such as completed purchases at "brick and mortar" retailers, online retailers, music applications, and shopping applications, completed listen actions for music playlists on third-party applications, streaming music online radio, or through an application on the social networking system platform 100, as well as author agents publishing information about customers, graduates, friends, contact lists, and so forth through a third-party publisher 106. Claims may also be generated through custom graph actions performed on custom graph objects on and external to the social networking system platform 100.

After the claim is published 406 to the social graph of the social networking system platform 100, an advertisement request having targeting criteria based on the claim may be received 408 by the social networking system platform 100. The advertisement request may target one or more agents included as target agents in the claim, such as 2012 graduates of Stanford University, customers of a large retailer, target agents that live in San Francisco as indicated through a third-party application that publishes contact information as entered by other agents, and agents that have authored claims about interests in golf by publishing links to stories about golf, pictures of golfers, and/or played gaming applications related to golf that published claims about the games. In one embodiment, a social networking system platform 100 may infer one or more characteristics about an agent based on claims, such that an advertiser may target ads based on the inferred characteristics. As a result, ads having targeting criteria based on inferred characteristics from claims may also be received 408 by the social networking system platform 100. In another embodiment, an advertiser may include a search query for the social networking system platform 100 to perform in the selected targeting criteria for an advertisement such that claims about target agents with various keywords are included in the targeting criteria.

A second terms of service agreement between the advertiser agent and the third-party publisher is negotiated 410. These terms may include a fee-arrangement or revenue sharing agreement that may be negotiated 410 in exchange for enabling claims to be used for advertising purposes, such as targeting advertisements based on the claims, using the claims as part of advertisements, and developing advertising campaigns based on the claims, in one embodiment. In another embodiment, claims may be used for an advertising purpose of retargeting advertisements previously displayed to an agent based on claims made by the agent or about the agent that are relevant to the advertisements. The second terms of service agreement between the advertiser agent 102d and the third party publisher 106 may be negotiated 410 through a user interface on the social networking system platform 100, an application programming interface (API), or through a separate interface. Based on the second negotiated terms of service agreement between the advertiser agent and the third-party publisher, the claim is enabled 412 for use in advertising.

An ad display request may be received 414 from a viewing agent 102c of the social networking system platform 100, such as when the viewing agent 102c loads a web page associated with the social networking system platform 100, loads an application associated with the social networking system platform 100, and/or a third-party application associated with the social networking system platform 100. The advertisement request may, in one embodiment, rely on the claim generated by the author agent 102a through the third party publisher 106. In another embodiment, the social networking system platform 100 may identify the viewing agent 102c as an agent included in targeting criteria of the advertisement. Responsive to the request, the advertisement is provided 416 to the viewing agent based on the advertisement request from the advertiser agent.

Figure 5:
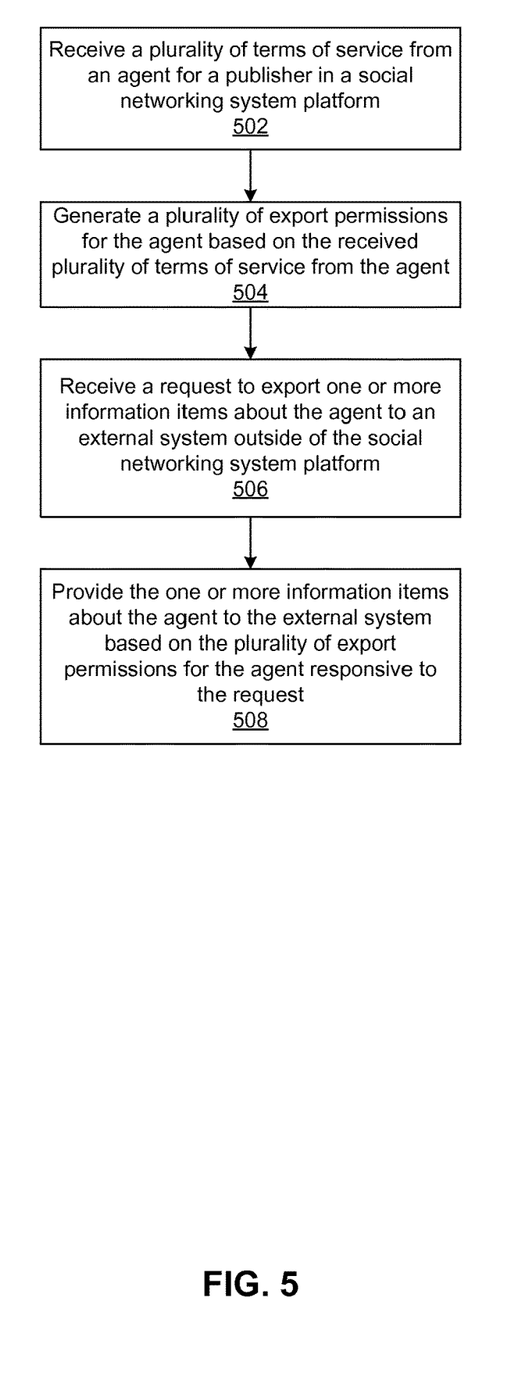
FIG. 5 is a flowchart diagram illustrating a process of generating export permissions for claims in a social networking system platform, in accordance with an embodiment of the invention.

FIG. 5 is a flowchart diagram illustrating a process of generating export permissions for claims in a social networking system platform, in accordance with an embodiment of the invention. A plurality of terms of service from an agent for a publisher in a social networking system are received 502. Such terms of service received 502 from the agent for a publisher may include terms selected by the publisher and agreed to by the agent as a result of using the publisher to publish claims into the social networking system platform 100. In another embodiment, the plurality of terms of service are received 502 from the publisher on behalf of the agent.

A plurality of export permissions are generated 504 for the agent based on the received plurality of terms of service from the agent. The plurality of export permissions generated 504 for the agent are associated with the claims generated by the agent through the publisher. In one embodiment, the plurality of export permissions are generated 504 for the agent as metadata objects associated with the claims generated by the agent through the publisher. The plurality of export permissions may be generated 504 as a result of processing the plurality of terms of service received 502 from the agent. In one embodiment, an exporting permission that may be generated 504 includes a deletion right that enables an agent generating a claim through a publisher to view any claims that have been generated and the ability to delete the claims. The deletion ability may effectively limit the audience of the deleted claims to no agents on the social networking system platform 100, in one embodiment.

A request to export one or more information items about the agent to an external system outside of the social networking system platform is received 506. The request to export one or more information items about the agent may be received 506 from an agent of the social networking system platform 100, in one embodiment. The request to export information items about the agent may be received 506 as a result of a search for the information items, in another embodiment. The request to export one or more information items about the agent may be received 506 from an application acting on behalf of an agent, in yet another embodiment. The application acting on behalf of an agent may be an application operating on the social networking system platform 100, such as a contact information sharing application generated by administrators of the social networking system platform 100, a third-party developed application for aggregating photos of agents in the social networking system platform 100, a third-party publisher that generates claims based on other claims made in the social networking system platform 100 such as restaurant reviews made by agents, and so forth.

The one or more information items about the agent are provided 508 to the external system based on the plurality of export permissions for the agent responsive to the request. The contact information sharing application may enable a viewing agent to download contact information about a particular agent to the viewing agent's mobile phone, for example. A third-party developed application for aggregating photos of agents may publish the aggregated photos on an external system, as another example. A third-party publisher that generates claims in the social networking system platform 100 based on restaurant reviews may export the claims to an external system for analysis before generating claims in the social networking system platform 100, as a further example. For example, the third-party publisher may generate a claim that identifies several restaurants nearby that, when combined with reviews by other connected agents and external users of a third-party restaurant review application, may be recommended for the viewing agent on the social networking system platform 100. In these ways, among others, one or more information items are provided 508 to the external system based on the plurality of export permissions for the agent responsive to the request.

Figure 6:
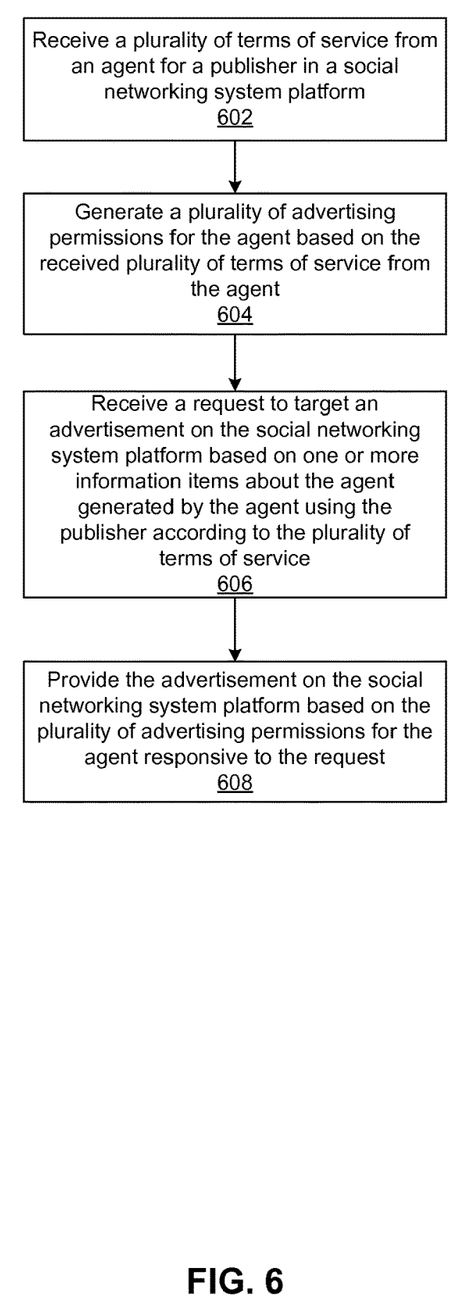
FIG. 6 is a flowchart diagram illustrating a process of generating advertising permissions for claims in a social networking system platform, in accordance with an embodiment of the invention.

FIG. 6 is a flowchart diagram illustrating a process of generating advertising permissions for claims in a social networking system platform, in accordance with an embodiment of the invention. A plurality of terms of service are received 602 from an agent for a publisher in a social networking system platform. Such terms of service received 602 from the agent for a publisher may include terms selected by the publisher and agreed to by the agent as a result of using the publisher to publish claims into the social networking system platform 100. In another embodiment, the plurality of terms of service are received 602 from the publisher on behalf of the agent. The plurality of terms of service may include an opt-out term that enables claims generated by the publisher to be used for advertising targeting purposes unless the agent opts out.

A plurality of advertising permissions for the agent are generated 604 based on the received plurality of terms of service from the agent. A first advertising permission that may be generated 604 includes a targeting exclusion that excludes one or more agents from using the claim for targeting advertisements. The publisher may specify these agents in the terms of service with the agent, in one embodiment. A second advertising permission that may be generated 604 includes a targeting setting that defines a fee arrangement negotiated for use of the claim for advertising purposes, such as a cost-per-click (CPC) or cost-per-impression (CPM). For example, a publisher, such as Walmart, may have an application that enables agents to publish information about their purchases at the retailer. A targeting exclusion may include specific competitor retailers, such as Costco, Target, and Walgreens, from using claims generated by agents using the Walmart application to publish claims about purchases of diapers, for example. However, an advertiser for Pampers brand diapers may not be specifically excluded from using those claims. In contrast, an advertiser for Pampers may have negotiated a fee arrangement to use claims about purchases of diapers for targeting advertisements about Pampers diapers to those agents publishing those claims. As a result, if agents click on the Pampers ads, a CPC of $0.05 or CPM of $0.001 may be charged to the advertiser and the fee may be delivered to the publisher, the Walmart application through the social networking system platform 100. The social networking system platform 100 may charge a transaction fee to the advertiser, the publisher, or both, in various embodiments.

A third advertising permission that may be generated 604 includes a boosting permission that enables a claim to be boosted by an advertiser, such as a claim that includes a favorable review of a product and/or service being promoted by the advertiser. The favorable review of a product, such as Pampers diapers, may be boosted by the advertiser to be displayed more prominently in the social networking system platform 100, higher in ranking of newsfeed content items, and/or in a dedicated section of a main landing webpage for connected agents of the authoring agent on the social networking system platform 100. A fourth advertising permission that may be generated 604 includes an update right for updating any of the advertising permissions. For example, the publisher of the Walmart application may negotiate a fee arrangement with advertisers for Target to not be excluded from using the claims generated by the application on behalf of agents. In that example, the update right would be used to remove Target as a targeting exclusion, thus updating the advertising permissions for claims generated by the application on behalf of agents. In one embodiment, an advertising permission that may be generated 604 includes a deletion right that enables an agent generating a claim through a publisher to view any claims that have been generated and the ability to delete the claims.

A request to target an advertisement on the social networking system platform is received 606 based on one or more information items about the agent generated by the agent using the publisher according to the plurality of terms of service. The request to target the advertisement may be received 606 through an interface with the social networking system platform 100, such as a user interface or application programming interface (API). The request to target the ad may include targeting criteria that includes the one or more information items about the agent that may be generated by the agent using the publisher according to the plurality of terms of service, such as information about purchasing diapers at Walmart, the total amount of items purchased during a trip to Walmart, an aggregated monthly amount spent using the Walmart application, and so on. The targeting criteria may include less specific criteria, such as identifying users of the Walmart application in certain geographic regions to target to those users. In one embodiment, an advertiser may include in selected targeting criteria for an advertisement instructions for the social networking system platform 100 to perform a search for claims about target agents that includes agent-inputted keywords in the search query. As a result of the ad request including the targeting criteria that relies on information about the agent generated through the publisher according to the plurality of terms of service, the request to target the advertisement having the targeting criteria may be received 606 by the social networking system platform 100.

The advertisement may then be provided 608 on the social networking system platform based on the plurality of advertising permissions for the agent responsive to the request. The advertisement may be provided 608 for display on a webpage of the social networking system platform 100, on a mobile application, or through another communication mechanism with the agent. The advertisement may be provided 608 to one or more connected agents associated with the agent that generated the one or more information items in the social networking system platform 100, in one embodiment. In another embodiment, the advertisement may be provided 608 to audience agents of a claim comprising the one or more information items generated by the agent through a publisher 112 for publishing to the social graph in the social networking system platform 100.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a plurality of terms of service for an agent using a publisher, the plurality of terms of service pertaining to generating one or more claims in a platform system;
   generating a plurality of permissions for the agent regarding whether claims generated by the agent may be exported outside of the platform system, the permissions based on the received plurality of terms of service;
   receiving a request to export one or more claims generated by the agent outside of the platform system;
   determining whether the one or more claims may be exported outside of the platform system according to the plurality of permissions; and
   responsive to a determination that the plurality of permissions allow the one or more claims to be exported outside of the platform system, exporting the one or more claims generated by the agent outside of the platform system responsive to the request.

2. The method of claim 1, wherein receiving a plurality of terms of service for an agent using a publisher to generate one or more claims in a social networking system platform further comprises:

receiving the plurality of terms of service from the agent as a metadata object associated with the one or more claims generated by the agent through the publisher.

3. The method of claim 1, wherein receiving a plurality of terms of service for an agent using a publisher to generate one or more claims in a social networking system platform further comprises:

receiving the plurality of terms of service from the agent as a metadata object associated with the agent.

4. The method of claim 1, wherein receiving a plurality of terms of service for an agent using a publisher to generate one or more claims in a social networking system platform further comprises:

receiving the plurality of terms of service from the publisher as a metadata object associated with the one or more claims generated by the agent.

5. The method of claim 1, wherein receiving a plurality of terms of service for an agent using a publisher to generate one or more claims in a social networking system platform further comprises:

receiving the plurality of terms of service from the publisher as a metadata object associated with the agent.

6. The method of claim 1, wherein receiving a plurality of terms of service for an agent using a publisher to generate one or more claims in a social networking system platform further comprises:

receiving the plurality of terms of service as a metadata object associated with the one or more claims generated by the agent through an interface on the social networking system platform.

7. The method of claim 1, wherein receiving a terms of service agreement between an agent using a publisher further comprises:

providing an application programming interface on the social networking system platform for receiving the plurality of terms; and receiving through the application programming interface the plurality of terms.

8. The method of claim 1, wherein receiving a claim from the publisher further comprises:

receiving one or more additional terms for the terms of service agreement as one or more metadata objects included in the received claim 1, where the one or more additional terms update the terms of service agreement.

9. The method of claim 1, wherein the agent comprises an entity in the social networking system platform.

10. The method of claim 1, wherein the agent comprises a user in the social networking system platform.

11. A non-transitory computer readable medium having embedded thereon a program, the program being executable by a processor for performing a method comprising instructions, the instructions comprising:

receiving a plurality of terms of service for an agent using a publisher, the plurality of terms of service pertaining to generating one or more claims in a platform system;

generating a plurality of permissions for the agent regarding whether claims generated by the agent may be exported outside of the platform system, the permissions based on the received plurality of terms of service;

receiving a request to export one or more claims generated by the agent outside of the platform system;

determining whether the one or more claims may be exported outside of the platform system according to the plurality of permissions; and responsive to a determination that the plurality of permissions allow the one or more claims to be exported outside of the platform system, exporting the one or more claims generated by the agent outside of the platform system responsive to the request.

12. The non-transitory computer readable medium of claim 11, wherein receiving a plurality of terms of service for an agent using a publisher to generate one or more claims in a social networking system platform further comprises:

receiving the plurality of terms of service from the agent as a metadata object associated with the one or more claims generated by the agent through the publisher.

13. The non-transitory computer readable medium of claim 11, wherein receiving a plurality of terms of service for an agent using a publisher to generate one or more claims in a social networking system platform further comprises:

receiving the plurality of terms of service from the agent as a metadata object associated with the agent.

14. The non-transitory computer readable medium of claim 11, wherein receiving a plurality of terms of service for an agent using a publisher to generate one or more claims in a social networking system platform further comprises:

receiving the plurality of terms of service from the publisher as a metadata object associated with the one or more claims generated by the agent.

15. The non-transitory computer readable medium of claim 11, wherein receiving a plurality of terms of service for an agent using a publisher to generate one or more claims in a social networking system platform further comprises:

receiving the plurality of terms of service from the publisher as a metadata object associated with the agent.

16. The non-transitory computer readable medium of claim 11, wherein receiving a plurality of terms of service for an agent using a publisher to generate one or more claims in a social networking system platform further comprises:

receiving the plurality of terms of service as a metadata object associated with the one or more claims generated by the agent through an interface on the social networking system platform.

17. The non-transitory computer readable medium of claim 11, wherein receiving a terms of service agreement between an agent using a publisher further comprises:

providing an application programming interface on the social networking system platform for receiving the plurality of terms; and receiving through the application programming interface the plurality of terms.

18. The non-transitory computer readable medium of claim 11, wherein receiving a claim from the publisher further comprises:

receiving one or more additional terms for the terms of service agreement as one or more metadata objects included in the received claim, where the one or more additional terms update the terms of service agreement.

19. The non-transitory computer readable medium of claim 11, wherein the agent comprises an entity in the social networking system platform.

20. A system, comprising:

a processor;

a memory, comprising:

a publisher interface module causing the processor to receive for a plurality of terms of service for an agent using a publisher, the plurality of terms of service pertaining to generating one or more claims in a platform system;

a permissions generating module causing the processor to generate a plurality of permissions for the agent regarding whether claims generated by the agent may be exported outside of the platform system, the permissions based on the received plurality of terms of service;

a claim exporting module causing the processor to receive a request to export one or more claims generated by the agent outside of the platform system;

an advertising permission module causing the processor to deterine whether the one or more claims may be exported outside of the platform system according to the plurality of permissions; and the claim exporting module further causing the processor to, responsive to a determination that the plurality of permissions allow the one or more claims to be exported outside of the platform system, export the one or more claims generated by the agent outside of the platform system responsive to the request.

* * * * *

UNITED STATES PATENT AND TRADEMARK OFFICE
CERTIFICATE OF CORRECTION

PATENT NO. : 10,445,771 B2
APPLICATION NO. : 14/923365
DATED : October 15, 2019
INVENTOR(S) : Samuel Lessin It is certified that error appears in the above-identified patent and that said Letters Patent is hereby corrected as shown below:

In the Claims

Column 19, Line 48, In Claim 8, delete "claim 1," and insert --claim,-- therefor
Column 20, Line 67, In Claim 20, after "receive", delete "for"
Column 21, Line 15, In Claim 20, delete "deterine" and insert --determine-- therefor Signed and Sealed this
Sixteenth Day of June, 2020

Andrei Iancu
*Director of the United States Patent and Trademark Office*